United States Patent [19]

Luethi

[11] Patent Number: 4,918,737

[45] Date of Patent: Apr. 17, 1990

[54] HEARING AID WITH WIRELESS REMOTE CONTROL

[75] Inventor: Walter Luethi, Ebnat-Kappel, Switzerland

[73] Assignee: Siemens Aktiengesellschaft, Berlin and Munich, Fed. Rep. of Germany

[21] Appl. No.: 216,102

[22] Filed: Jul. 7, 1988

[30] Foreign Application Priority Data

Jul. 7, 1987 [CH] Switzerland .......................... 2577/87

[51] Int. Cl.[4] .......................... H04R 25/00; H04B 5/00

[52] U.S. Cl. .............................. 381/68.4; 340/825.67; 340/825.72; 381/79; 381/68; 455/41

[58] Field of Search .......................... 381/68, 68.4, 79; 340/696, 825.69, 825.72; 455/41

[56] References Cited

U.S. PATENT DOCUMENTS

| | | | |
|---|---|---|---|
| 2,319,627 | 5/1943 | Perlman | 381/68 |
| 3,237,105 | 2/1966 | Kalmus | 455/41 |
| 3,659,056 | 4/1972 | Morrison et al. | 381/68 |
| 3,894,195 | 7/1975 | Kryter | 381/68.2 |
| 4,145,720 | 3/1979 | Weintraub et al. | 455/20 |
| 4,334,315 | 6/1982 | Ono et al. | 455/41 |
| 4,591,836 | 5/1986 | Feigenblatt, Jr. et al. | 340/574 |
| 4,689,820 | 8/1987 | Köpke et al. | 381/68 |
| 4,763,340 | 8/1988 | Yoneda et al. | 455/41 |
| 4,777,474 | 10/1988 | Clayton | 381/68 |
| 4,790,019 | 12/1988 | Hueber | 381/68.4 |

FOREIGN PATENT DOCUMENTS

| | | | |
|---|---|---|---|
| 379929 | 3/1986 | Austria . | |
| 546419 | 9/1957 | Canada | 381/68 |
| 1000080 | 2/1984 | European Pat. Off. | 381/68 |
| 0175909 | 8/1985 | European Pat. Off. . | |
| 179536 | 4/1986 | European Pat. Off. | 381/68 |
| 1762293 | 4/1970 | Fed. Rep. of Germany . | |
| 1938381 | 2/1971 | Fed. Rep. of Germany . | |
| 3032311 | 3/1981 | Fed. Rep. of Germany | 381/68 |
| 3028575 | 10/1982 | Fed. Rep. of Germany | 381/68 |
| 3243850 | 5/1984 | Fed. Rep. of Germany | 381/68 |
| 3431584 | 3/1986 | Fed. Rep. of Germany . | |
| 3527112 | 1/1987 | Fed. Rep. of Germany | 381/68 |
| 3642828 | 8/1987 | Fed. Rep. of Germany | 381/68 |
| 60-154800 | 8/1985 | Japan | 381/68 |
| 894884 | 12/1981 | U.S.S.R. | 455/41 |
| 1256743 | 9/1986 | U.S.S.R. | 381/68 |
| 1469509 | 4/1977 | United Kingdom . | |
| 1565701 | 4/1980 | United Kingdom | 381/68 |

*Primary Examiner*—Jin F. Ng
*Assistant Examiner*—Danita R. Byrd
*Attorney, Agent, or Firm*—Hill, Van Santen, Steadman & Simpson

[57] ABSTRACT

A hearing aid has a housing which can be worn at the head, such as in or behind the ear, and which contains the basic electrical and acoustic elements of the hearing aid. The housing has a portion adapted for introduction into the auditory canal, and a cover, both of which are electrically conductive and are insulated from each other by an insulating layer therebetween, thus forming a capacitor. A control device for transmitting control signals to the hearing aid housing is integrated in a commonly worn article, such as a wristwatch or a piece of jewelry. The control device has a capacitor having spaced plates, the plates forming components of the commonly worn article. The control device includes one or more manually operable control signal actuators which generate an electric field at the control device permitting the control signals to be capacitively transmitted to the housing, such as in the form of a pulse sequence.

17 Claims, 2 Drawing Sheets

HEARING AID WITH WIRELESS REMOTE CONTROL

BACKGROUND OF THE INVENTION

1. Field of the Invention

The present invention is directed to hearing aids, and in particular to a hearing aid having a housing worn at the head, and a control device for wirelessly transmitting control signals to the components in the housing.

2. Description of the Prior Art

A number of different versions of hearing aids are known in the art which include a housing adapted to be worn in the ear of a user, and a control device for controlling the functions of the hearing aid such as, for example, volume, which is disposed remote from the housing and which transmits the control signals to the housing without a connecting wire. Such remote control of the functions of the hearing aid is helpful because the current miniaturization capabilities for the housing worn in or behind the ear make it difficult to manually actuate control elements, such as a thumbwheel, located directly at the housing.

A hearing aid system is described in German OS 34 31 584 wherein ultrasound signals are used to transmit information from the control device to the hearing aid housing. The microphone for the hearing aid assumes the function of a receiver element for the ultrasound control signals. A similar device is also described in Austrian Patent 379 929.

It is known from German OS 19 38 381 to use radio waves for transmitting the control signals. This type of apparatus, however, has the disadvantage of being relatively susceptible to disruption. Moreover, difficulties arise relating to the relatively large spectral range of such radio signals, the necessary resonant circuits, and the modulation methods. In this and other systems, it is desirable that the control device be of a size which can be held in the hand, and easily operated. In known systems, the control device necessarily must have a certain size, which makes it difficult for the user to carry conveniently. Moreover, if a person forgets to carry the control device, setting of the volume of the hearing aid is no longer possible.

SUMMARY OF THE INVENTION

It is an object of the present invention to provide a hearing aid having a wireless remote control device which is relatively insusceptible to disruption, and which enables control of the most important functions of the hearing aid with minimum energy consumption.

It is a further object of the present invention to provide a control device for such a hearing aid which is small and can be conveniently carried by a user.

The above objects are achieved in accordance with the principles of the present invention in a hearing aid wherein the housing has components thereof which are arranged to form a capacitor, and the control device also has components arranged to form a capacitor. The components forming the capacitor of the control device may be integrated in, or conventional parts of, a commonly worn article, such as a wristwatch. An electrical field is generated at the control device as the medium for signal transmission, and changes in the capacitance at the control device, caused by the manual actuation of control elements at the control device, induce a corresponding signal voltage via the capacitor at the housing, which functions as a receiver. The control signals can consist of pulses which can be modulated at the control device by any number of circuit means well-known to those skilled in the art.

Capacitive remote control using the relatively strong electrical field has the advantage that the range of the transmitter is highly limited, and the transmitted signals are relatively impervious to disturbances. Additionally, LSI components can be used, thereby contributing to a relatively simplified structure of the control device. The energy consumption of the control device is relatively low.

The reception means at the housing requires substantially no external operating elements, so that all functions, such as on/off, volume and filtering can be operated via the remote control. To achieve an operating distance for the control device which is convenient for the user, the field strength between the control device and the receiver/housing is preferably greater than 0.05V/cm. A transmitter range of about one meter is thus achieved.

In a preferred embodiment, the control device and the receiver/housing each have at least two capacitor plates forming the respective capacitors, and at least one capacitor plate is connectable to the body of the user either by a direct electrically conductive connection or a capacitively coupled connection. The fashioning of the capacitor plates as normal components of commonly worn articles permits the capacitor to be constructed in a space saving manner. As used herein, the term "plate" is used in the electrical engineering sense associated with a capacitor as meaning one of the electrically conductive elements of a capacitor which is separated from the other electrically conductive element, or plate, of the capacitor by a dielectric. Thus as used herein the term "plate" does not necessarily mean a planar element.

By connecting one of the plates to the body of the user, the capacitance of the user's body becomes a part of the transmission/reception system. In a preferred embodiment, one capacitor plate at both the control device and at the receiver/housing has such body contact.

Normal structural elements in the housing can be used as the plates of the capacitor forming a part of the receiver. For example, the housing may have a portion introducable into the auditory canal, which can be at least partially electrically conductive. The housing also has a cover which may be at least partially electrically conductive, and is separated from the electrically conductive portion of the housing by an insulating layer therebetween. Since the housing portion which is adapted to the anatomical shape of the auditory canal is already present in conventional hearing aids, the physical shape of the housing need not be altered to achieve the structure and function for the purposes of the present invention; it is only necessary to comprise the housing portion of electrically conductive material and to add an insulating layer and an electrically conducting cover. The electrically conducting cover can be achieved by a metallic coding, such as a coating with precious metal. This coating does not change the three-dimensional shape of the housing. Such coating also ensures an electrically conductive connection to the body of the user. The control components at the receiver are accommodated in the housing as a chip, and require no more space than the reception and control components in conventional hearing aids.

One embodiment of the control device is integrated in a wristwatch, with the backplate of the watch being electrically conductive, and a further conductive region, which is electrically insulated from the backplate of the watch, may be arranged, for example, on the watchglass. Integrating the control device in a wristwatch has the advantage that the control device will be virtually always worn, and that others will not recognize it as a control device for a hearing aid.

The backplate of the watch can form one of the two capacitor plates in the control device, and will thus be in contact with the body of a user without further measures. The other plate of the capacitor can be disposed on the watchglass, with the watchglass then acting as the dielectric relative to the backplate of the watch.

Manually actuatable control elements are provided at the control device, such as a plurality of pushbuttons. Such pushbuttons can be actuated easily in the dark, or by vision-impaired persons. The most recently pressed button preferably remains in its engaged position, so that the control position which is currently valid can be identified. If the control device is embodied in a wristwatch, it is alternatively possible to provide a ring at the circumference of the wristwatch which is rotatable with infinite variation or step wise, for entering the control instructions instead of the pushbuttons.

DESCRIPTION OF THE PREFERRED EMBODIMENTS

Figure 4:
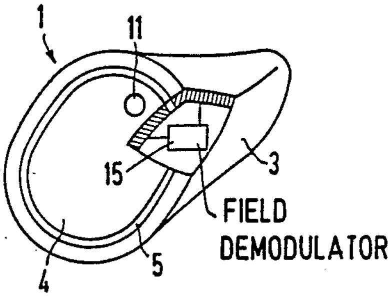
FIG. 4 is a perspective view, partly in section, of a receiver for the hearing aid constructed in accordance with the principles of the present invention embodied in a housing.

As shown in FIG. 4, a portion of the receiver for a hearing aid constructed in accordance with the principles of the present invention can be embodied in the housing 1 of the portion of the hearing aid which is worn at the head of a user. The housing 1 includes a portion 3 which is adapted in shape to be received in the auditory canal, and is terminated with a cover 4. The exterior of the portion 3 of the housing and the cover 4 are provided with a metallic coating. The metallic coating on the cover 4 can be painted with an electrically insulating paint corresponding to skin color to make the housing less noticeable when worn. The cover 4 is electrically insulated from the portion 3 by an insulation layer or ring 5. The cover 4 has a microphone opening 11. All components of the hearing aid such as, for example, amplifiers, volume adjustment circuitry, earphone and battery are accommodated in the housing 1. Manual actuating elements such as, for example, switches or potentiometers do not have to be attached to the housing 1. The cover 4 and the portion 3 of the housing 1 form two plates of a capacitor, separated by the insulating layer 5, and are electrically connected to the remaining components of a known receiver, including a field demodulator 15, which are also accommodated in the housing 1.

Figure 1:
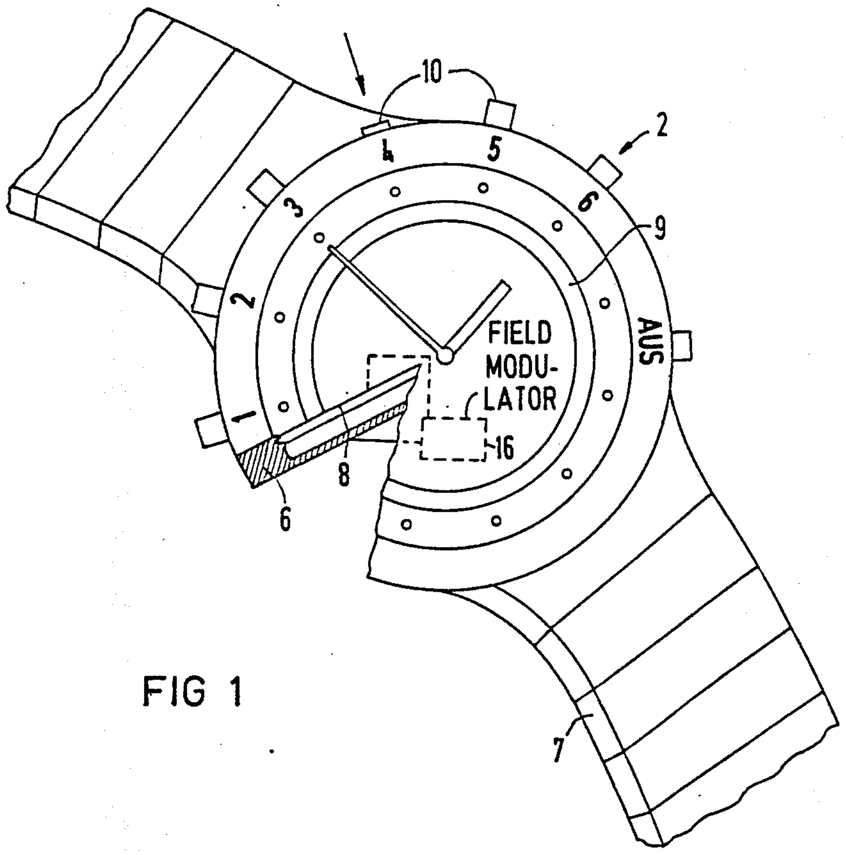
FIG. 1 is a plane view, partly in section, of a control device for a hearing aid constructed in accordance with the principles of the present invention embodied in a wristwatch.

A control device 2 integrated in a wristband is shown in FIG. 1. The watch has a backplate 6, which will usually already consist of electrically conducting metal, and thus forms an electrically conducting plate. A further metallic conductor 9 is disposed, for example, in the form of a ring around the watchglass 8, and may, for example, be vapor-deposited thereon. The watch backplate 6 and the conductor 9 form two plates of another capacitor. The watchband 7 is also preferably constructed of electrically conductive material, and is electrically connected to the backplate 6, so that the watch band 7 also forms a portion of the capacitor, and provides a substantial area for direct body contact. The remaining components of the control device 2 are accommodated inside the watch, and consists of known modulating circuitry, including a field modulator 16, responsive to capacitive changes to modulate the transmitted signal, such as pulse code modulation (PCM) circuitry or pulse position modulation (PPM) circuitry. Those skilled in the art are familiar with these and other capacitive-responsive circuits, and such circuitry therefore need not be explained in greater detail.

Control instructions can be entered at the control device 2 by the depression of one or more pushbuttons 10 disposed at the exterior of the wristwatch. For example, specific volume ranges of the hearing aid can be selected by the depression of individual keys or combinations of keys. It is also possible, however, to having a continuous volume variation.

Figure 5:
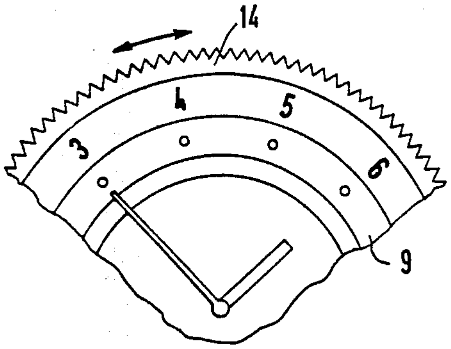
FIG. 5 is a plan view of a portion of a further embodiment of a wristwatch embodying the control device of the hearing aid constructed in accordance with the principles of the present invention, showing an alternative control signal actuator.

Alternatively, as shown in FIG. 5, the control instruction actuator can be in the form of a ring or thumbwheel 14 disposed at the circumference of the wristwatch, which is rotatable, as indicated by the double arrow, to achieve a continuous or step wise variation in the function, such as volume, which it controls.

The control device 2 need not be necessarily integrated in a wristwatch. The components can be accommodated in some other housing, for example jewelry, such as a charm, worn around the neck, a hand-held box, or an auxiliary housing which can be plugged onto a commonly worn article, such as a wristwatch. It is also not necessary that the housing 1 be provided with a portion for introduction into the auditory canal. The necessary components could also be accommodated in a housing having another type of conventional structure, such as a behind-the-ear housing.

Figure 2:
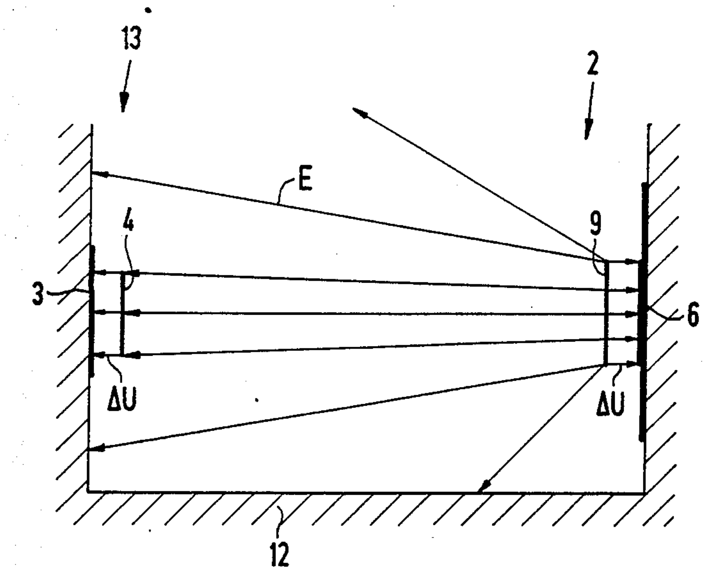
FIG. 2 is a schematic illustration of the operational principle of the hearing aid constructed in accordance with the principles of the present invention with a direct electrical connection of the capacitor plates to the body of the user.

The principles of operation of the hearing aid information transmittal are schematically shown in FIG. 2. The control device 2, as described above, includes a plate capacitor consisting of, for example, the backplate 6 of the wristwatch, and the conductor 9 as plates. The receiver 13 also includes a plate capacitor which, as described above, is formed by the cover 4 and the housing portion 3 as plates thereof. The backplate 6 and the housing portion 3 are in direct electrical contact with the body 12 of a user, and are thus shorted through the body 12. A difference $\Delta U$ in potential is generated at the control device 2, whereby an electric field having a field strength E of, preferrably more than 0.05V/cm.

Within the range of the control device 2, a voltage is induced at the cover 4 of the receiver 13 due to the electrical field. This control voltage is amplified by suitable amplifiers, and is used for the control of the individual elements of the hearing aid. Pulses having an arbitary chronolgical spacing can be transmitted easily using the control device 2. Pulse code modulation or pulse position modulation may be used to encode the control signals.

Figure 3:
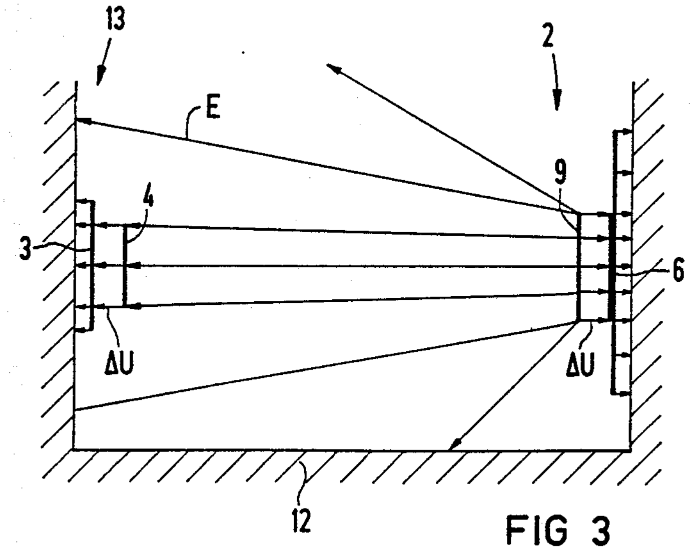
FIG. 3 is a schematic illustration of a further embodiment of the operational principle of the hearing aid constructed in accordance with the principles of the present invention, wherein the capacitor plates are capacitively coupled to the body of the user.

As shown in FIG. 3, the respective capacitor plates formed by the housing portion 3 and the backplate 6 may be capacitively coupled to the body 12 of a user, through an intervening dielectric. In this embodiment, the capacitors formed at the transmitter and receiver can be considered to be in series with the respective capacitors which are formed between the plates 3 and 6 and the body 12 of the user.

Although modifications and changes may be suggested by those skilled in the art it is the intention of the inventor to embody within the patent warranted hereon all changes and modifications as reasonably and properly come within the scope of his contribution to the art.

I claim as my invention:

1. A hearing aid comprising:

a housing worn at the head of a user containing controllable means for amplifying incoming sound and means for receiving and demodulating capacitively transmitted control signals for said means for amplifying, said means for receiving and demodulating including first means for forming a plate capacitor having a voltage which varies responsive to said transmitted control signals; and a wireless control device integrated in a wristwatch disposed remote from said housing including a rotatable ring disposed around a circumference of said wristwatch for manually entering control instructions for said means for amplifying, and means for modulating and capacitively transmitting said control signals to said housing including second means for forming a plate capacitor having a voltage which varies responsive to said control instructions and thereby generating said control signals as an electric field to induce said voltage at said first means for forming a plate capacitor.

2. A hearing aid as claimed in claim 1, wherein said housing consists of a plurality of structural components, and wherein said means for forming a plate capacitor has at least one plate formed by one of said structural elements.

3. A hearing aid as claimed in claim 1, wherein said wireless control device consists of a plurality of structural elements, and wherein said second means for forming a plate capacitor includes at least one plate formed by one of said structural elements.

4. A hearing aid as claimed in claim 1, wherein said second means for forming a plate capacitor generates an electric field having a strength at said first means for forming a plate capacitor greater than 0.05V/cm.

5. A hearing aid as claimed in claim 1, wherein each of said first means for forming a plate capacitor and said second means for forming a plate capacitor have at least two capacitor plates.

6. A hearing aid as claimed in claim 5, wherein at least one of said capacitor plates in said first means for forming a plate capacitor or said second means for forming a plate capacitor is directly electrically connected to the body of said user.

7. A hearing aid as claimed in claim 5, wherein at least one of said capacitor plates in said first means for forming a plate capacitor or said second means for forming a plate capacitor is capacitively coupled to the body of said user.

8. A hearing aid comprising:

a housing having a section having a shape for introduction into the auditory canal of a user, said section having an electrically conductive portion, a cover for said housing section, and an insulating layer disposed between said cover and said housing section, said cover, said insulating layer and said housing section forming a first capacitor, said housing containing controllable means for amplifying incoming sound and means connected to said first capacitor for receiving and demodulating capacitively transmitted control signals, said transmitted control signals inducing a voltage at said first capacitor which varies responsive to said transmitted control signals; and a wireless control device disposed in a wristwatch worn by said user, said wristwatch having an electrically conductive backplate, a watchglass, and an electrically conductive region on said watchglass, said electrically conductive region, said watchglass and said backplate forming a second capacitor, said control device including means at an exterior of said wristwatch for manually entering control instructions for said means for amplifying and means connected to said second capacitor for modulating and capacitively transmitting said control signals to said first capacitor in said housing, said second capacitor having a voltage which varies responsive to said control instructions and thereby generating said control signals as an electric field to induce said voltage at said first capacitor.

9. A hearing aid comprising:

a housing shaped for introduction into the auditory canal of a user containing controllable means for amplifying incoming sound and means for receiving and demodulating capacitively transmitted control signals for said means for amplifying, said housing having an electrically conductive portion and an electrically conductive cover, said means for receiving and demodulating including a first plate capacitor having a voltage which varies responsive to said transmitted control signals, said first plate capacitor formed by said electrically conductive portion of said housing and said electrically conductive cover with an insulator disposed therebetween; and a wireless control device disposed remote from said housing including means for manually entering control instructions for said means for amplifying, and means for modulating and capacitively transmitting said control signals to said housing including a second plate capacitor having a voltage which varies responsive to said control instruction and thereby generating said control signals as an electrical field to induce said voltage at said first plate capacitor.

10. A hearing aid as claimed in claim 9, wherein said electrically conductive part of said portion of said housing consists of a precious metal coating.

11. A hearing aid as claimed in claim 9, further comprising an electrically insulating paint coating said cover.

12. A hearing aid as claimed in claim 9, wherein said wireless control device is integrated in a wristwatch, and wherein said means for manually entering control instructions is a plurality of pushbuttons on said wristwatch.

13. A hearing aid as claimed in claim 9, wherein said wireless control device is integrated in a wristwatch, and wherein said means for manually entering control instuctions is a rotable ring disposed around a circumference of said wristwatch.

14. A hearing aid comprising:

a housing worn at the head of a user containing controllable means for amplifying incoming sound and means for receiving and demodulating capacitively transmitted control signals for said means for amplifying, said means for receiving and demodulating including a first plate capacitor having a voltage which varies responsive to said transmitted control signals; and a wireless control device integrated in a wristwatch disposed remote from said housing including means for manually entering control instructions for said means for amplifying, said wristwatch having an electrically conductive backplate and a separate conductive region, and means in said wristwatch for modulating and capacitively transmitting said control signals to said housing including a second plate capacitor having a voltage which varies responsive to said control instructions and thereby generating said control signals as an electric field to induce said voltage at said first plate capacitor, said second plate capacitor formed by said electrically conductive backplate, said separate conductive region and an insulator therebetween.

15. A hearing aid as claimed in claim 14, wherein said watch has a watchglass forming said means for insulating said backplate from said conductive region, said conductive region being disposed on said watchglass.

16. A hearing aid as claimed in claim 14, wherein said means for manually entering control instructions is a plurality of push buttons on said wristwatch.

17. A hearing aid as claimed in claim 14, wherein said means for manually entering control instructions is a rotatable ring disposed around a circumference of said wristwatch.

* * * * *